United States Patent [19]  [11] Patent Number: 4,655,886
Oda et al.  [45] Date of Patent: Apr. 7, 1987

[54] ION EXCHANGE MEMBRANE CELL AND ELECTROLYSIS WITH USE THEREOF

[75] Inventors: Yoshio Oda; Takeshi Morimoto; Kohji Suzuki, all of Yokohama, Japan

[73] Assignee: Asahi Glass Company, Ltd., Tokyo, Japan

[21] Appl. No.: 381,745

[22] Filed: May 24, 1982

Related U.S. Application Data

[63] Continuation-in-part of Ser. No. 205,567, Nov. 10, 1980, and a continuation-in-part of Ser. No. 355,312, Mar. 5, 1982.

[51] Int. Cl.$^4$ ............................................... C25B 1/14
[52] U.S. Cl. ..................................... 204/98; 204/128; 204/129; 204/263; 204/266; 204/296
[58] Field of Search ................. 204/98, 128, 129, 283, 204/263, 266, 296

[56] References Cited

U.S. PATENT DOCUMENTS

| 4,100,050 | 7/1978 | Cook et al. | 204/98 |
| 4,124,458 | 11/1978 | Moeglich | 204/98 |
| 4,135,996 | 1/1979 | Bouy et al. | 204/98 |
| 4,212,713 | 7/1980 | Suhara et al. | 204/98 |
| 4,224,121 | 9/1980 | Dempsey et al. | 204/98 |
| 4,250,013 | 2/1981 | Carlin | 204/282 |

FOREIGN PATENT DOCUMENTS 1120003  3/1979  Canada ................................. 204/98

Primary Examiner—R. L. Andrews
Attorney, Agent, or Firm—Oblon, Fisher, Spivak, McClelland & Maier

[57] ABSTRACT

An ion exchange membrane cell comprising an anode, cathode, and an anode compartment and a cathode compartment partitioned by an ion exchange membrane. The ion exchange membrane is a cation exchange membrane having a gas and liquid permeable porous non-electrode layer on at least one side thereof. The cation exchange membrane is composed of a fluorinated cation exchanger having carboxylic acid groups as its ion exchange groups and with its ion exchange capacity being varied in the direction of its thickness.

20 Claims, No Drawings

ION EXCHANGE MEMBRANE CELL AND ELECTROLYSIS WITH USE THEREOF

This application is a continuation in part of application Ser. No. 205,567, filed Nov. 10, 1980, and a continuation in part of Application Ser. No. 355,312 filed Mar. 5, 1982.

BACKGROUND OF THE INVENTION

1. Field of the Invention

The present invention relates to an electrolytic cation exchange membrane electrolytic cell. More particularly it relates to a cation exchange membrane electrolytic cell suitable for electrolysis of an aqueous solution of an electrolyte such as water, an acid, a base, an alkali metal halide or an alkali metal carbonate, and to an ion exchange membrane for the electrolytic cell.

2. Description of the Prior Art

As a process for producing an alkali metal hydroxide and chlorine by the electrolysis of the above mentioned aqueous solution, particularly an aqueous solution of an alkali metal chloride, a diaphragm method has now been used in place of a mercury method with a view to preventing environmental pollution. Further, in order to efficiently obtain an alkali metal hydroxide having a high purity in a high concentration, it has been proposed and put into practical use to employ an ion exchange membrane.

On the other hand, from the standpoint of energy saving, it is desired to minimize the cell voltage in the electrolysis of this type. For this purpose, various methods have been proposed. However, in some cases, the cell voltage reduction is not adequate and in other cases, the electrolytic cell tends to be intricate, and thus no adequately satisfactory solution has yet been made.

The present inventors have conducted a research with an aim to carry out electrolysis of an aqueous solution at a minimal load voltage, and as a result, it has been found that the above object can be accomplished with use of a cation exchange membrane having a gas and liquid permeable porous non-electrode or non-electrocatalytic layer on at least one side thereof. This has been made the subject matter of European Patent Publication No. 0029,751, (U.S. Ser. No. 205,567) and U.S. Ser. No. 355,312.

The effectiveness for reducing the cell voltage obtainable by the use of such a cation exchange membrane having a porous layer on its surface, varies depending upon the material constituting the porous layer, the porosity and the thickness of the layer. However, it is regarded as an unexpected phenomenon that good cell voltage reducing effectiveness is obtainable even when the porous layer is made of an electrically non-conductive material as will be described hereinafter, or that the cell voltage can be reduced even when such a cation exchange membrane is disposed with a space from the electrode, whereby the electrode may not necessarily be disposed in contact with the membrane.

SUMMARY OF THE INVENTION

From a further study on the above mentioned cation exchange membrane, it has been found possible not only to reduce the cell voltage in the electrolysis but also to improve the current efficiency when a cation exchange membrane having a porous layer on its surface is formed by a fluorinated cation exchanger having carboxylic acid groups as its ion exchange groups and with its ion exchange capacity being varied in the direction of its thickness.

Thus, it is an object of the present invention to provide an electrolytic cation exchange membrane which is capable of reducing the cell voltage and improving the current efficiency when applied to an electrolytic cell.

Another object of the present invention is to provide an ion exchange membrane cell in which such a cation exchange membrane is used.

A further object of the present invention is to provide a process for electrolyzing an aqueous solution of an alkali metal chloride in an electrolytic cell wherein the above mentioned cation exchange membrane is used.

The present invention provides an ion exchange membrane cell comprising an anode, a cathode, and an anode compartment and a cathode compartment partitioned by an ion exchange membrane, in which said ion exchange membrane is a cation exchange membrane having a gas and liquid permeable porous non-electrode or non-electrocatalytic layer on at least one side thereof and said cation exchange membrane is a membrane of a fluorinated cation exchanger having carboxylic acid groups as its ion exchange groups and with its ion exchange capacity being varied in the direction of its thickness.

The electrolytic cation exchange membrane according to the present invention has a gas and liquid permeable porous non-electrode layer on at least one side thereof and is characterized in that said cation exchange membrane is formed by a fluorinated cation exchanger having carboxylic acid groups as its ion exchange groups and with its ion exchange capacity being varied in the direction of its thickness.

The process for electrolyzing an aqueous solution of an alkali metal chloride according to the present invention is carried out in the above mentioned electrolytic cell in which the above mentioned cation exchange membrane is used.

The electrolytic cation exchange membrane according to the present invention provides a minimal cell voltage and a high current efficiency which have not been obtainable by the conventional methods, and such superior effectiveness is obtainable even from the initial stage of the electrolysis when such a cation exchange membrane is used. Thus, the industrial significance of the cation exchange membrane of the present invention is extremely high.

DETAILED DESCRIPTION OF THE PREFERRED EMBODIMENTS

The gas and liquid permeable porous layer provided on the cation exchange membrane according to the present invention is formed preferably by bonding particles onto the membrane surface. The amount of the particles applied to form the porous layer varies depending upon the nature and size of the particles. However, according to the research made by the present inventors, it has been found that the amount of the particles is preferably from 0.005 to 50 mg, especially from 0.001 to 30 mg per 1 $cm^2$ of the membrane surface. If the amount is too small, the desired level of effectiveness expected by the present invention is not obtainable. On the other hand, the use of an excessively large amount tends to lead to an increase of the membrane resistance.

The particles forming the gas and liquid permeable porous layer on the surface of the cation exchange membrane of the present invention may be electrically conductive or non-conductive and may be made of inorganic material or organic material, so long as they do not function as an electrode. However, the particles are preferably made of material having corrosion resistance against the electrolyte solution. Moreover, an inorganic material is more preferably used than an organic material due to its superior performance in the voltage reduction.

As preferred specific material for the porous layer on the anode side, there may be used a single substance, an alloy, an oxide, a hydroxide, a nitride or a carbide of a metal of Group IV-A (preferably silicon, germanium, tin or lead), Group IV-B (preferably titanium, zirconium or hafnium) or Group V-B (preferably niobium or tantalum) of the Periodic Table, an iron group metal (iron, cobalt or nickel), chromium, manganese or boron, polytetrafluoroethylene, or an ethylene-tetrafluoroethylene copolymer.

On the other hand, for the porous layer on the cathode side, there may preferably be used, in addition to the materials useful for the formation of the porous layer on the anode side, silver, zirconium or their alloys, stainless steel, carbon (active carbon or graphite), a polyamide resin, a polysulfonic resin, a polyphenyleneoxide resin, a polyphenylenesulfide resin, a polypropylene resin or a polyimide resin.

In the formation of the porous layer, the above mentioned particles are used preferably in a form of powder having a particle size of from 0.01 to 300$\mu$, especially from 0.1 to 100$\mu$. In some cases, there may be used a binder, for example, a fluorocarbon polymer such as polytetrafluoroethylene or polyhexafluoroethylene, or a viscosity controlling agent, for example, a cellulose material such as carboxymethyl cellulose, methyl cellulose or hydroxyethyl cellulose or a water-soluble material such as polyethylene glycol, polyvinyl alcohol, polyvinyl pyrrolidone, sodium polyacrylate, polymethylvinyl ether, casein or polyacrylamide. Such a binder or viscosity controlling agent is used preferably in an amount of from 0.1 to 50% by weight, especially from 0.5 to 30% by weight based on the above mentioned powder.

Further, if desirable, it is possible to incorporate a suitable surfactant such as a long chain hydrocarbon or a fluorinated hydrocarbon and graphite or other conductive filler to facilitate the bonding of the particles or groups of particles onto the membrane surface.

To bond the particles or groups of particles onto the ion exchange membrane to form a porous layer, the above mentioned conductive or non-conductive particles and, if necessary, a binder and a viscosity controlling agent, are sufficiently mixed in a suitable medium such as an alcohol, ketone, ether or hydrocarbon and the paste of the mixture thus obtained is applied to the membrane surface by e.g. transfer or screen printing. Instead of the paste of the mixture comprising the above mentioned particles or groups of particles, a syrup or a slurry of the mixture may be prepared and it may be sprayed onto the membrane surface to bond the particles or groups of particles thereto.

The particles or groups of particles applied to the ion exchange membrane to form a porous layer is then preferably heat-pressed on the ion exchange membrane at a temperature of from 80° to 220° C. under pressure of from 1 to 150 kg/cm$^2$ or 1 to 150 kg/cm with use of a flat press or rolls press respectively. It is preferred to partially embed the particles or groups of particles into the membrane surface.

The porous layer formed by the particles or groups of particles bonded to the membrane surface preferably has a porosity of at least 10 to 95%, especially at least 30 to 90% and a thickness of from 0.01 to 100$\mu$, especially from 0.1 to 50$\mu$.

The porous layer formed on the membrane surface, may be a dense layer in which a great amount of particles are bonded to the membrane surface. Otherwise, it is possible to form the layer to have a single layer structure in which the particles or groups of particles are independently bonded to the membrane surface without being in contact with one another. In such a case, the amount of the particles to be used for the formation of the porous layer can substantially be reduced and it is thereby possible in some cases to simplify the means for forming the porous layer.

Further, instead of applying the particles onto the membrane surface as mentioned above, it is possible to form the porous layer of the present invention also by bonding to the membrane surface, a porous layer preliminarily formed to have the above mentioned properties. In such a case, the preformed porous layer may advantageously be formed on a film made of polymer such as polytetrafluoroethylene and polyester, and then the resulting preformed layer on said film is transferred to a surface of a membrane.

In the present invention, it is important that the cation exchange membrane on which the porous layer is formed, is made of a fluorinated cation exchanger having carboxylic acid groups as its ion exchange groups and with its ion exchange capacity being varied in the direction of its thickness. The variation of the ion exchange capacity in the direction of the thickness of the cation exchange membrane of the present invention is preferably such that when used in electrolysis, the ion exchange capacity of the membrane is increased from the cathode side toward the anode side. In such a case, the above mentioned object of the present invention can better be accomplished than the case where the increment of the ion exchange capacity is in the opposite direction, i.e. a greater reduction of the cell voltage and a greater improvement of the current efficiency are thereby obtainable. The variation of the ion exchange capacity may be continuous or stepwise and may optionally be chosen depending upon the process for the manufacture of the membrane.

The variation of the ion exchange capacity according to the present invention is preferably made within a range of from 0.5 to 2.5 milliequivalent/gram dry polymer. If the ion exchange capacity is less than the above range, the cell voltage tends to be greater e.g. in electrolysis of an aqueous alkali metal chloride solution. On the other hand, if the ion exchange capacity exceeds the above range, the water content of the membrane tends to be greater thus leading to an decrease of the current efficiency. The range of the ion exchange capacity is more preferably within a range of from 0.8 to 2.0 milliequivalent/gram dry polymer. When the ion exchange capacity is varied within the above mentioned range according to the present invention, the maximum difference in the ion exchange capacity is preferably from 0.1 to 1.0 milliequivalent/gram dry polymer, especially from 0.2 to 0.9 milliequivalent/gram dry polymer Various methods may be used to prepare the cation exchange membrane of the present invention with the ion exchange capacity varied in the direction of the thickness. For instance, there may be used a method for laminating at least two fluorinated polymer films having different ion exchange capacities. The lamination can be made by placing preliminarily prepared polymers having different ion exchange capacities one on another and press-forming them under pressure of from 0.1 to 150 kg/m² at a temperature of from 120° to 350° C. at which these polymers melt. It is possible to use more than two polymer films having different ion exchange capacities. However, usually the use of two different polymer films suffices for practical purposes. The thickness of each polymer film for the lamination is optionally selected depending upon the ion exchange capacity of the polymer. However, the thickness of the polymer film having a smaller ion exchange capacity on the cathodes side is preferably made thinner than the thickness of the polymer film having a greater ion exchange capacity on the anode side, and is preferably from 1 to 400μ, preferably 10 to 300μ when the thickness of the whole membrane is from 50 to 100μ. By this lamination method, a fluorinated cation exchange polymer membrane with its ion exchange capcity varied stepwise in the direction of its thickness is obtainable.

As another method for preparing the cation exchange membrane of the present invention, there may be used a method in which a fluorinated cation exchange polymer membrane having a uniform ion exchange capacity is subjected to certain appropriate treatment to deactivate the ion exchange capability of some of the carboxylic acid groups as ion exchange groups of the membrane so that the ion exchange capacity of the membrane will thereby be rather continuously varied in the direction of its thickness. As such treatment, there may be used one or more treatments selected from oxidation treatment, reduction treatment, alkali treatment, Grignard reaction treatment, Claisen reaction treatment, Huns-Decker reaction treatment, thermal decomposition treatment, dischargetreatment, ionizing radiation treatment, flame treatment and plasma polymerization treatment. Such treatment is carried out to an extent not to impair the object of the present invention, i.e. to an extent that carboxylic cation exchange groups are partly modified within a depth of preferably 50μ, especially 5μ from the surface of the membrane. Excessive treatment tends to destroy the polymer constituting the cation exchange membrane itself, and it is preferred to carry out the treatment in a short period of time.

A specific method for such surface treatment of the cation exchange membrane is disclosed in e.g. U.S. Pat. Nos. 4,212,713 and 425,333. Other known methods may also be used for the surface treatment.

As the fluorinated polymers having carboxylic acid groups according to the present invention, there may be used a variety of fluorinated polymers, but among them, polymers having the recurring units (a) and (b) are particularly preferred.

(a) $+CF_2-CXX'+$, (b) $+CF_2-CX+$
$\phantom{(a) +CF_2-CXX'+, (b) +CF_2-}|$
$\phantom{(a) +CF_2-CXX'+, (b) +CF_2-}Y$ where X is —F, —Cl, —H or —CF₃, X' is X or CF₃(CF₂)ₘ where m is from 1 to 5, Y is selected from the following:

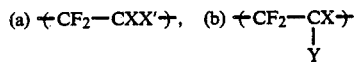

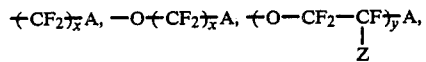

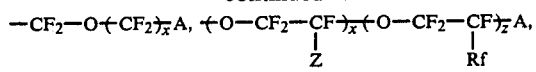

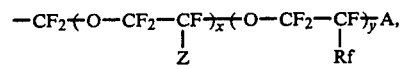

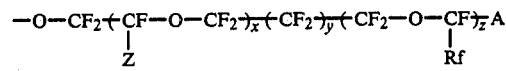

where x, y and z respectively represent an integer of 0 to 10, Z and Rf respectively represent —F or a perfluoroalkyl group having from 1 to 10 carbon atoms, and A represents —SO₃M, —COOM, or a functional group convertible into these groups by hydrolysis, such as —SO₂F, —CN, —COF or —COOR, where M is hydrogen or an alkali metal and R is an alkyl group having from 1 to 10 carbon atoms.

As mentioned above, the cation exchange membrane to be used in the present invention is formed to have an ion exchange capacity of from 0.5 to 2.5 milliequivalence/gram dry polymer. In the case of forming the ion exchange membrane from a copolymer comprising the recurring units (a) (b), it is preferred that the polymer units (b) constitute from 1 to 40 molar %, especially from 3 to 25 molar %.

The ion exchange membrane may be prepared by various method per as known, and if required, the ion exchange membrane may preferably be reinforced by a woven fabric such as cloth or net or non-woven fabric or fibril made of a fluorinated polymer such as polytetrafluoroethylene or by a mesh or perforated material made of metal. The ion exchange membrane of the present invention preferably has a thickness of from 20 to 500μ, especially from 50 to 400μ.

When the porous layer is formed on the membrane surface on the anode or cathode side or both sides of the ion exchange membrane, the ion exchange groups of the membrane should take a suitable form not to lead to decomposition thereof. For instance, the carboxylic acid groups should preferably take a form of an acid or an ester.

Any type of the electrode may be used for the membrane of the present invention. For instance, there may be used foraminous electrodes such as a perflorated plate, a net or an expanded metal. As a typical example of the foraminous electrode, there may be mentioned an expanded metal having a major length of from 1.0 to 10 mm, a minor length of from 0.5 to 10 mm, a width of a mesh of from 0.1 to 1.3 mm and an opening area of from 30 to 90%. Further, a plurality of electrode meshes may be used. In such a case, it is preferred that a plurality of electrode meshes having different opening areas are arranged so that meshes having a less opening area is set closer to the membrane.

The anode is usually made of a platinum group metal or a conductive oxide or a conductive reduced oxide thereof. On the other hand, cathode is usually made of a platinum group metal or a conductive oxide thereof or an iron group metal.

As the platinum group metal, there may be mentioned Pt, Rh, Ru, Pd and Ir. As the iron group metal, there may be mentioned iron, cobalt, nickel, Raney nickel, stabilized Raney nickel, stainless steel, a stainless steel treated by etching with a base (U.S. Pat. No. 4,255,247) Raney nickel plated cathode (U.S. Pat. Nos. 4,170,536 and 4,116,804) nickel rhodanate plated cathode (U.S. Pat. Nos. 4,190,514 and 4,190,516).

When foraminous electrodes are used, they may be made of the materials for the anode or the cathode by themselves. When the platinum metal or a conductive oxide thereof is used, it is usually preferable to coat such material on an expanded metal made of a valve metal such as titanium or tantalum.

When the electrodes are placed in the electrolytic cell of the present invention, they may be disposed to contact the ion exchange membrane, or they may be placed with an appropriate space from the ion exchange membrane. The electrodes are preferably moderately pressed to the porous layer at a pressure of e.g. from 0.01 to 5.0 kg/cm$^2$ rather than forcibly pressed to the ion exchange membrane via the porous layer.

Further, in a case where the porous layer was provided on only one side of the ion exchange membrane, i.e. either the anode or cathode side, according to the present invention, the electrode placed on the side of the ion exchange membrane provided with no porous layer, may likewise be disposed in contact with or with a space from the ion exchange membrane.

The electrolytic cell used in the present invention may be a monopolar or bipolar type so long as it has the above mentioned structure. The electrolytic cell used in the electrolysis of an aqueous solution of an alkali metal chloride, is made of a material being resistant to the aqueous solution of the alkali metal chloride and chlorine such as valve metal like titanium in the anode compartment and is made of a material being resistant to an alkali metal hydroxide and hydrogen such as iron, stainless steel or nickel in the cathode compartment.

In the present invention, the process condition for the electrolysis of an aqueous solution of an alkali metal chloride can be the known condition as disclosed in the above mentioned U.S. patent applications. For instance, an aqueous solution of an alkali metal chloride (from 2.5 to 5.0 Normal) is fed into the anode compartment and water or a dilute solution of an alkali metal hydroxide is fed into the cathode compartment and the electrolysis is preferably conducted at a temperature of from 80° to 120° C. and at a current density of from 10 to 100 A/dm$^2$. In this case, heavy metal ions such as calcium or magnesium ions in the aqueous solution of the alkali metal chloride tend to lead to degradation of the ion exchange membrane, and therefore, it is desirable to minimize the presence of such heavy metal ions. Further, in order to prevent the generation of oxygen at the anode as far as possible, an acid such as hydrochloric acid may be added to the aqueous alkali metal chloride solution.

In the foregoing, the use of the membrane of the present invention has been described primarily with respect to the electrolysis of an aqueous alkali metal chloride solution. However, it should be understood that the membrane of the present invention is likewise applicable to the electrolysis of water, a halogen acid (hydrochloric acid or hydrobromic acid).

Now, the present invention will be described with reference to Examples which are provided for purposes of illustration and are not intended to limit the present invention.

EXAMPLE 1

Tetrafluoroethylene and $CF_2=CFO(CF_2)_3COOCH_3$ were copolymerized in a trichlorotrifluoroethane solvent in the presence of azobisiobutyronitrile as a catalyst, whereby a copolymer having an ion exchange capacity of 1.32 milliequivalent/gram dry polymer and a copolymer having an ion exchange capacity of 1.44 milliequivalent/gram dry polymer were prepared.

A film of the above mentioned copolymer having the ion exchange capacity of 1.32 milliequivalence and having a thickness of 30μ and a film of the copolymer having the ion exchange capacity of 1.44 milliequivalence and having a thickness of 250μ were press-formed at 220° C. under pressure of 25 kg/cm$^2$ for 5 minutes, whereupon a laminated membrane was obtained.

On the other hand, a mixture comprising 10 parts of rutile type titanium oxide powder having a particle size of from 10 to 20μ and obtained by sieving a commercial product (particle size of not more than 25μ), 0.4 part of methyl cellulose (a 2% aqueous solution having a viscosity of 1500 cps), 19 parts of water, 2 parts of cyclohexanol and one part of cyclohexanone, was kneaded to obtain a paste. The paste thus obtained was screen-printed on the anode side surface of the above mentioned cation exchange membrane having the ion exchange capacity of 1.44 milliequivalent, with use of a polyester screen having 200 mesh and a thickness of 75μ, a printing plate provided with a screen mask having a thickness of 30μ beneath the screen, and a squeegee made of polyurethane. The printed layer on the membrane surface was dried in the air.

Then, in the same manner, α-silicon carbide particles having an average particle size of 5μ were printed on the opposite membrane surface on the other side of the membrane having thus provided with the porous layer on the anode side surface.

Thereafter, the particle layers on the respective membrane surfaces were press-fixed to the ion exchange membrane surfaces at a temperature of 140° C. under pressure of 30 kg/cm$^2$. Then, the ion exchange membrane was hydrolyzed by dipping it in a 25 wt% sodium hydroxide aqueous solution at 90° C. for 16 hours. The titanium oxide particles and the silicon carbide particles were deposited on the respective sides of the membrane in an amount of 1.0 mg and 0.7 mg, respectively, per 1 cm$^2$ of the membrane surface.

COMPARATIVE EXAMPLES 1 AND 2

In the same manner as in Example 1, the same porous layers as in Example 1 were formed on each of a uniform cation exchange membrane composed of a copolymer of Example 1 having an ion exchange capacity of 1.32 milliequivalent and a thickness of 280μ, and a uniform cation exchange membrane composed of a copolymer of Example 1 having an ion exchange capacity of 1.44 and a thickness of 280μ. The respective cation exchange membranes thus provided with the porous layers were designated as the membranes of the Comparative Examples 1 and 2.

EXAMPLE 2

In the same manner as in Example 1, tetrafluoroethylene and $CF_2=CFOCF_2CF(CF_3)O(CF_2)_3COOCH_3$ were copolymerized to obtain a copolymer having an ion exchange capacity of 1.15 milliequivalent and a copolymer having an ion exchange capacity of 1.30 milliequivalent.

A film of the copolymer having the ion exchange capacity of 1.15 milliequivalent and a thickness of 30μ and a film of the copolymer having the ion exchange capacity of 1.30 milliequivalent and a thickness of 250μ, were press-formed at 200° C. under pressure of 25 kg/cm² for 5 minutes to obtain a laminated membrane.

On the other hand, in the same manner as in Example 1, stannic oxide powder having an average particle size of 4μ was printed and fixed on the anode side surface of the membrane having the ion exchange capacity of 1.30 milliequivalent and boron carbide powder having an average particle size of 5μ was printed and fixed on the cathode side surface of the membrane having the ion exchange capacity of 1.15 milliequivalent.

The stannic oxide and the boron carbide was deposited on the respective sides of the membrane in an amount of 1.1 mg and 0.9 mg, respectively, per 1 cm² of the membrane surface. Then, the ion exchange membrane was hydrolyzed under the same conditions as in Example 1.

EXAMPLE 3

In the same manner as in Example 1, tetrafluoroethylene and $CF_2=CFO(CF_2)_3COOCH_3$ were copolymerized to obtain a copolymer having an ion exchange capacity of 1.70 milliequivalent/gram dry polymer and a copolymer having an ion exchange capacity of 1.25 milliequivalent/gram dry polymer.

A film of the copolymer having the ion exchange capacity of 1.70 and a thickness of 250μ and a film of the copolymer having the ion exchange capacity of 1.25 and a thickness of 30μ, were press-formed at 200° C. under pressure of 25 kg/cm² for 6 minutes to obtain a laminated membrane.

On the other hand, a mixture comprising 10 parts of zirconium oxide powder having an average particle size of 4μ, one part of modified PTFE particles having a particle size of not more than 0.5μ and prepared by coating polytetrafluoroethylene particles with a copolymer of tetrafluoroethylene and $CF_2=CFO(CF_2)_3COOCH_3$, 0.4 part of methyl cellulose (a 2% aqueous solution having a viscosity of 1500 cps), 19 parts of water, 2 parts of cyclohexanol and one part of cyclohexanone, was kneaded to obtain a paste.

In the same manner as in Example 1, the paste was screenprinted on the anode side surface of the cation exchange membrane having the ion exchange capacity of 1.70, and the printed layer thus formed on the membrane surface was dried in the air.

On the other hand, in the same manner as above, nickel oxide particles having an average particle size of 8μ was applied to the cathode side surface of the membrane having the ion exchange capacity of 1.25. Then, the particle layers on the respective sides of the membrane were press-fixed to the respective membrane surfaces at a temperature of 140° C. under pressure of 30 kg/cm². Thereafter, the cation exchange membrane was hydrolyzed by dipping it in a 25 wt% sodium hydroxide aqueous solution at 90° C. for 16 hours.

The zirconium oxide and the nickel oxide were deposited on the respective sides of the ion exchange membrane in an amount of 0.9 mg and 1.2 mg, respectively, per 1 cm² of the membrane surface.

EXAMPLE 4

Two sheets of 10 cm² were cut out from a cation exchange membrane having a thickness of 280μ and composed of a copolymer of $CF_2=CF_2$ and $CF_2=CFO(CF_2)_3COOCH_3$ and containing 2.7% by weight of PTFE fibril. The two membrane sheets were placed one on the other and pressfixed at 80° C. under pressure of 30 kg/cm². The fixed membranes were suspended in a nickel container and dipped in a container of a 50 wt% sodium hydroxide solution and held at 100° C. for 20 hours. Thereafter, they were immersed in a 12 wt% sodium hydroxide solution at 90° C. for 16 hours for hydrolysis. Then, they were washed with ion-exchanged water and then peeled from each other. The two membranes were immersed in a 1N hydrochloric acid solution at 90° C. for 16 hours to convert the ion exchange groups into an acid type. After washing the membrane with ion-exchanged water, they were immersed in a 95% methanol solution at room temperature for 16 hours to esterify the ion exchange groups. The esterified membranes were dried at room temperature for 3 hours and then at 60° C. for 3 hours. By this treatment, the ion exchange capacity on the surface of each membrane which was not fixed to the fixing surface of the other membrane, was decreased to 1.28 milliequivalent/gram dry polymer.

Then, in the same manner as in Example 1, titanium oxide particles were printed and fixed on the anode side surface of the thus obtained ion exchange membrane having the ion exchange capacity of 1.44 and α-type silicon carbide particles were printed and fixed on the cathode side surface of the membrane having the ion exchange capacity of 1.28. Then, the ion exchange membrane was hydrolyzed. The titanium oxide particles and the silicon carbide particles were deposited on the respective surfaces in an amount of 1.1 mg and 0.8 mg, respectively, per 1 cm² of the membrane surface.

EXAMPLES 5 TO 7

Cation exchange membranes having porous layers on their surfaces were prepared in the same manner as in Example 1 except that the composition of the paste constituting the porous layer, was varied, and the materials, the particle sizes and the amounts of deposition as shown in Table 1 were used.

The particle sizes of the particles used were adjusted to the respective ranges as shown in Table 1 by pulverizing or classifying the prepared products or commercially available products as the cases required. Further, from the microscopic observation of the porous layer formed on the membrane surface, in Example 6, the particles or groups of particles were observed to be deposited with a space from one another on the membrane surface.

TABLE 1

| Examples | Anode side Material (average particle size) Amount of deposition | Cathode side Material (average particle size) Amount of deposition |
|---|---|---|
| 5 | $Fe_2O_3$ (2μ) 0.4 mg/cm² | Graphite (2μ) 0.5 mg/cm² |
| 6 | $TiO_2$ (10μ) 0.1 mg/cm² | β-SiC (5μ) 0.05 mg/cm² |
| 7 | $Fe(OH)_3$ (0.1μ) 0.2 mg/cm² | —SiC (5μ) 0.8 mg/cm² |

EXAMPLE 8

Tetrafluoroethylene and $CF_2=CFO(CF_2)_3COOCH_3$ were copolymerized in a trichlorotrifluoroethane solvent in the presence of azobisiobutyronitrile as a catalyst, whereby a copolymer having an ion exchange capacity of 1.25 milliequivalent/gram dry polymer and a copolymer having an ion exchange capacity of 1.90 milliequivalent/gram dry polymer were prepared.

A film of the above mentioned copolymer having the ion exchange capacity of 1.25 milliequivalent and having a thickness of 30μ and a film of the copolymer having the ion exchange capacity of 1.90 milliequivalent and having a thickness of 250μ were press-formed at 220° C. under pressure of 25 kg/cm² for 5 minutes, whereupon a laminated membrane was obtained.

On the other hand, a mixture comprising 10 parts of rutile type zirconium oxide powder having a particle size of from 10 to 20μ and obtained by a sieving a commercial product (particle size of not more than 25μ), 0.4 part of methyl cellulose (a 2% aqueous solution having a viscosity of 1500 cps), 19 parts of water, 2 parts of cyclohexanol and one part of cyclohexanone, was kneaded to obtain a paste. The paste thus obtained was screen-printed on the anode side surface of the above mentioned cation exchange membrane having the ion exchange capacity of 1.44 milliequivalent, with use of a polyester screen having 200 mesh and a thickness of 75μ, a printing plate provided with a screen mask having a thickness of 30μ beneath the screen, and a squeegee made of polyurethane. The printed layer on the membrane surface was dried in the air.

Then, in the same manner, α-silicon carbide particles having an average particle size of 5μ were printed on the opposite membrane surface on the other side of the membrane having thus provided with the porous layer on the anode side surface.

Thereafter, the particle layers on the respective membrane surfaces were press-fixed to the ion exchange membrane surfaces at a temperature of 140° C. under pressure of 30 kg/cm². Then, the ion exchange membrane was hydrolyzed by dipping it in a 25 wt% sodium hydroxide aqueous solution at 90° C. for 16 hours. The zirconium oxide particles and the silicon carbide particles were deposited on the respective sides of the membrane in an amount of 1.0 mg and 1.0 mg, respectively, per 1 cm² of the membrane surface.

EXAMPLE 9

Tetrafluoroethylene and $CF_2=CFO(CF_2)_3COOCH_3$ were copolymerized in a trichlorotrifluoroethane solvent in the presence of azobisiobutyronitrile as a catalyst, whereby a copolymer having an ion exchange capacity of 0.86 milliequivalent/gram dry polymer and a copolymer having an ion exchange capacity of 1.44 milliequivalent/gram dry polymer were prepared.

A film of the above mentioned copolymer having the ion exchange capacity of 0.86 milliequivalent and having a thickness of 30μ and a film of the copolymer having the ion exchange capacity of 1.44 milliequivalent and having a thickness of 250μ were press-formed at 220° C. under pressure of 25 kg/cm² for 5 minutes, whereupon a laminated membrane was obtained.

On the other hand, a mixture comprising 10 parts of rutile type zirconium oxide powder having a particle size of from 10 to 20μ and obtained by sieving a commercial product (particle size of not more than 25μ), 0.4 part of methyl cellulose (a 2% aqueous solution having a viscosity of 1500 cps), 19 parts of water, 2 parts of cyclohexanol and one part of cyclohexanone, was kneaded to obtain a paste. The paste thus obtained was screen-printed on the anode side surface of the above mentioned cation exchange membrane having the ion exchange capacity of 1.44 milliequivalent, with use of a Tetoron screen having 200 mesh and a thickness of 75μ, a printing plate provided with a screen mask having a thickness of 30μ beneath the screen, and a squeegee made of polyurethane. The printed layer on the membrane surface was dried in the air.

Then, in the same manner, α-silicon carbide particles having an average particle size of 5μ were printed on the opposite membrane surface on the other side of the membrane having thus provided with the porous layer on the anode side surface.

Thereafter, the particle layers on the respective membrane surfaces were press-fixed to the ion exchange membrane surfaces at a temperature of 140° C. under pressure of 30 kg/cm². Then, the ion exchange membrane was hydrolyzed by dipping it in a 25 wt% sodium hydroxide aqueous solution at 90° C. for 16 hours. The zirconium oxide particles and the silicon carbide particles were deposited on the respective sides of the membrane in an amount of 1.0 mg and 1.0 mg, respectively, per 1 cm² of the membrane surface.

Now, the electrolytic performances of the ion exchange membranes of the present invention will be described with reference to Application Examples.

APPLICATION EXAMPLE 1

An anode having a low chlorine overvoltage and made of an titanium expanded metal (major length: 5 mm, minor length: 2.5 mm) coated with a solid solution of ruthenium oxide, iridium oxide and titanium oxide, was press-fixed to the anode side of the ion exchange membrane, and a cathode prepared by subjecting a SUS 304 expanded metal (major length: 5 mm, minor length: 2.5 mm) to etching treatment in a 25 wt% sodium hydroxide aqueous solution at 150° C. for 52 hours to have a low hydrogen overvoltage, was press-fixed to the cathode side of the ion exchange membrane. Electrolysis was conducted at 90° C. under 40 A/dm² while supplying a 5N sodium chloride aqueous solution to the anode compartment and water to the cathode compartment and maintaining the sodium chloride concentration in the anode compartment at a level of 3.5N and the sodium hydroxide concentration in the cathode compartment at a level of 35% by weight, except No. 9 (in this case, at a level of 23% by weight), whereby the results as shown in Table 2 were obtained.

In the Application Examples, the ion exchange membranes having porous layers are designated by the numbers of the respective Examples.

TABLE 2

| Nos. | Ion exchange membranes | Cell voltages (V) | Current efficiency (%) |
|---|---|---|---|
| 1 | Example 1 | 3.24 | 94.5 |
| 2 | Example 2 | 3.27 | 96.0 |
| 3 | Example 3 | 3.11 | 95.5 |
| 4 | Example 4 | 3.22 | 95.0 |
| 5 | Example 5 | 3.23 | 95.0 |
| 6 | Example 6 | 3.26 | 95.5 |
| 7 | Example 7 | 3.22 | 94.5 |
| 8 | Example 8 | 2.93 | 94.0 |
| 9 | Example 9 | 3.10 | 95.0 |
| 10 | Comparative Example 1 | 3.35 | 94.5 |
| 11 | Comparative Example 2 | 3.20 | 92.0 |

APPLICATION EXAMPLE 2

Electrolysis was carried out in the same manner as in Application Example 1 except that the anode and the cathode were not press-fixed to the ion exchange membrane and they were respectively placed with a space of 1.0 mm from the ion exchange membrane.

TABLE 3

| Nos. | Ion exchange membrane | Cell voltage (V) | Current efficiency (%) |
|---|---|---|---|
| 10 | Example 1 | 3.25 | 94.5 |
| 11 | Example 2 | 3.29 | 96.5 |
| 12 | Example 3 | 3.12 | 96.0 |
| 13 | Example 4 | 3.24 | 95.0 |
| 14 | Example 5 | 3.25 | 95.0 |
| 15 | Example 6 | 3.28 | 95.5 |
| 16 | Example 7 | 3.24 | 94.5 |
| 17 | Example 8 | 3.00 | 94.0 |
| 18 | Example 9 | 3.18 | 95.5 |
| 19 | Comparative Example 1 | 3.37 | 95.0 |
| 20 | Comparative Example 2 | 3.21 | 92.5 |

We claim:

1. In an ion exchange membrane cell which comprises an anode, a cathode, and an anode compartment and a cathode compartment partitioned by an ion exchange membrane, an improvement characterized in that said ion exchange membrane is a cation exchange membrane having a gas and liquid permeable porous non-electrode layer on at least one side thereof and said cation exchange membrane is a membrane of a fluorinated cation exchanger having carboxylic acid groups as its ion exchange groups and with its ion exchange capacity being varied in the direction of its thickness.

2. The ion exchange membrane cell according to claim 1 wherein the gas and liquid permeable porous layer is formed by an electrically conductive or non-conductive inorganic or organic material and applied in an amount of from 0.001 to 100 mg/cm$^2$.

3. The ion exchange membrane cell according to claim 1 or 2 wherein the ion exchange capacity of the cation exchange membrane is continuously or stepwise decreased from the anode side toward the cathode side within a range of from 0.5 to 2.5 milliequivalent/gram dry polymer.

4. The ion exchange membrane cell according to claim 1, 2, or 3 wherein the ion exchange capacity of the cation exchange membrane is varied so that the maximum difference in the ion exchange capacity is from 0.1 to 1.0 milliequivalent/gram dry polymer.

5. The ion exchange membrane cell according to any one of claims 1 to 4 wherein said cation exchange membrane is formed by laminating at least two fluorinated polymer films having carboxylic acid groups having different ion exchange capacities so that the ion exchange capacity on the cathode side is smaller than that on the anode side.

6. The ion exchange membrane cell according to any one of claims 1 to 5 wherein said cation exchange membrane is made of a fluorinated polymer film having carboxylic acid groups and the ion exchange capacity on the cathode side is made smaller than that on the anode side.

7. In an electrolytic cation exchange membrane having a gas and liquid permeable porous non-electrode layer on at least one side thereof, an improvement characterized in that said cation exchange membrane is formed by a fluorinated cation exchanger having carboxylic acid groups as its ion exchange groups and with its ion exchange capacity being varied in the direction of its thickness.

8. The electrolytic cation exchange membrane according to claim 7 wherein the gas and liquid permeable porous layer is formed by an electrically conductive or non-conductive inorganic or organic material and applied in an amount of from 0.005 to 50 mg/cm$^2$.

9. The electrolytic cation exchange membrane according to claim 8 wherein said inorganic material is composed of a single substance, an alloy, an oxide, a hydroxide, a nitride or a carbide of a metal of Group IV-A, VI-B or V-B of the Periodic Table, an iron group metal, chromium, manganese or boron.

10. The electrolytic cation exchange membrane according to claim 7 wherein the organic material is a fluorinated resin, a polyamide resin, a polysulfonic resin, a polyphenyleneoxide resin, a polyphenylenesulfide resin, a polypropylene resin, or a polyimide resin.

11. The electrolytic cation exchange membrane according to any one of claims 7 to 10 wherein the ion exchange capacity of the cation exchange membrane is continuously or stepwise decreased from the anode side toward the cathode side within a range of from 0.5 to 2.5 milliequivalent/gram dry polymer.

12. The electrolytic cation exchange membrane according to claim 7 or 11 wherein the ion exchange capacity of the cation exchange membrane is varied so that the maximum difference in the ion exchange capacity is from 0.1 to 1.0 milliequivalent/gram dry polymer.

13. The electrolytic cation exchange membrane according to claim 7, 11 or 12 wherein the fluorinated cation exchanger is formed by laminating at least two fluorinated polymer films having carboxylic acid groups having different ion exchange capacities.

14. The electrolytic cation exchange membrane according to claim 7, 11 or 12 wherein the fluorinated cation exchanger is made of a fluorinated polymer film having carboxylic acid groups and the ion exchange capacity on one side is smaller than that on the other side.

15. The ion exchange membrane according to any one of claims 7 to 14 wherein said fluorinated polymer has recurring units (a) and (b),

wherein X represents a fluorine, chlorine or hydrogen atom or —CF$_3$; X' represents X or CF$_3$(CF$_2$)$_m$; m represents an integer of 1 to 5; Y represents the following unit;

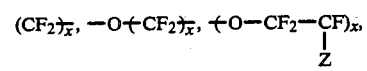

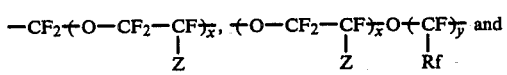

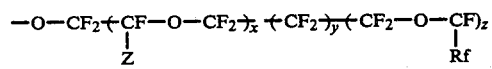

x, y and z respectively represent an integer of 1 to 10; z and Rf represent —F or a C$_1$–C$_{10}$ perfluoroalkyl group; and A represents —COOM or —SO$_3$M or a functional group which is convertible into —COOM or —SO$_3$M by hydrolysis or neutralization such as —CN, —COF, —COOR$_1$ or —SO$_2$F and M represents hydrogen or an alkali metal atom.

16. In a process for electrolyzing an aqueous solution of an electrolyte in an electrolytic cell comprising, an anode, a cathode, and an anode compartment and a cathode compartment partitioned by an ion exchange membrane, an improvement characterized in that said ion exchange membrane is a cation exchange membrane having a gas and liquid peameable porous non-electrode layer on at least one side thereof and said cation exchange membrane is a membrane of a fluorinated cation exchanger having carboxylic acid groups as its ion exchange groups and with its ion exchange capacity being varied in the direction of its thickness.

17. The process according to claim 16 wherein said electrolyte is an alkali metal chloride.

18. The process according to claim 17 wherein said electrolysis is performed by feeding an aqueous solution of an alkali metal chloride having a concentration of 2.5 to 5.0N into said anode compartment at a temperature of 60° to 120° C. at a current density of 10 to 100 A/dm$^2$.

19. The process according to claim 18 wherein water or a dilute aqueous solution of a base is fed into said cathode compartment to obtain an aqueous solution of an alkali metal hydroxide having a concentration of 20 to 50 wt.%.

20. The process according to claim 16 wherein electrolyte is water, and acid, a base or an alkali metal carbonate.

* * * * *